US010956880B2

(12) United States Patent
Towle

(10) Patent No.: US 10,956,880 B2
(45) Date of Patent: Mar. 23, 2021

(54) MIXED DEPLOYMENT ARCHITECTURE FOR DISTRIBUTED SERVICES

(71) Applicant: PAYPAL, INC., San Jose, CA (US)

(72) Inventor: Kyle Towle, Puyallup, WA (US)

(73) Assignee: PayPal, Inc., San Jose, CA (US)

( * ) Notice: Subject to any disclaimer, the term of this patent is extended or adjusted under 35 U.S.C. 154(b) by 1035 days.

(21) Appl. No.: 14/789,319

(22) Filed: Jul. 1, 2015

(65) Prior Publication Data
US 2017/0005883 A1  Jan. 5, 2017

(51) Int. Cl.
G06Q 20/00 (2012.01)
G06Q 20/10 (2012.01)
H04L 29/08 (2006.01)
G06F 9/50 (2006.01)
H04L 12/24 (2006.01)

(52) U.S. Cl.
CPC ......... *G06Q 20/102* (2013.01); *G06F 9/5072* (2013.01); *H04L 41/5051* (2013.01); *H04L 67/10* (2013.01); *H04L 67/1002* (2013.01)

(58) Field of Classification Search
CPC .............................. G06F 15/173; G06G 20/00
USPC ............................................................ 705/34
See application file for complete search history.

(56) References Cited

U.S. PATENT DOCUMENTS

| 8,762,484 | B2 * | 6/2014 | Ravichandran | ........ | G06Q 30/02 709/217 |
| 9,262,743 | B2 * | 2/2016 | Heins | ..................... | G06Q 10/10 |
| 9,378,065 | B2 * | 6/2016 | Shear | ...................... | G06F 40/00 |
| 9,805,345 | B1 * | 10/2017 | Dailianas | .............. | G06F 9/5061 |
| 2009/0276771 | A1 * | 11/2009 | Nickolov | ........... | H04L 67/1014 717/177 |
| 2010/0281166 | A1 * | 11/2010 | Buyya | ................... | G06F 9/5072 709/226 |
| 2013/0339099 | A1 * | 12/2013 | Aidroos | ................ | G06Q 50/01 705/7.36 |
| 2014/0282586 | A1 * | 9/2014 | Shear | .................... | G06F 9/5072 718/104 |
| 2015/0189009 | A1 * | 7/2015 | van Bemmel | ...... | H04L 67/1008 709/226 |

(Continued)

OTHER PUBLICATIONS

Grid Computing: Introduction and Overview, Manish Parashar and Craig A. Lee (IEEE) (Year: 2005).*

*Primary Examiner* — Bruce I Ebersman
(74) *Attorney, Agent, or Firm* — Haynes and Boone LLP

(57) ABSTRACT

Systems and methods for a mixed deployment architecture are provided. A data center system may include a core compute grid system and a plurality of distributed compute grid systems. The core compute grid system may provide one or more non-distributable services for a payment service provider, such as a database service, and may include one or more isolated environment zones. Each distributed compute grid system provides one or more distributable services for the payment service provider, and each distributed compute grid system provides an identical set of distributable services. The data center system also includes a network coupling the core compute grid system and plurality of distributed compute grid systems. The plurality of distributed compute grid systems transmit queued writes generated by the distributable services to the database service provided by the core compute grid system.

20 Claims, 6 Drawing Sheets

(56) References Cited

U.S. PATENT DOCUMENTS

2016/0014071 A1* 1/2016 Asati .................. H04L 61/6063
709/245
2016/0277391 A1* 9/2016 Choyi ............... H04W 12/0609
2017/0005883 A1* 1/2017 Towle .................. G06Q 20/102
2017/0005999 A1* 1/2017 Choyi ................ H04L 63/0435

\* cited by examiner

ND ARCHITECTURE
MIXED DEPLOYMENT ARCHITECTURE FOR DISTRIBUTED SERVICES

BACKGROUND

Field of the Invention

The present disclosure generally relates to applications executing on servers, and more particularly to a system and method for scalable deployment of services.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Transactions facilitated by a payment service provider may involve multiple services of the payment service provider, such as authentication services, database services, and other such services. Each service may be provided by a software application executing on a server. For reliability, availability, and other considerations, many payment service providers use large numbers of servers to provide the various services needed by the payment service provider. As the number of customers of the payment service provider grows, effectively facilitating customer transactions requires an increasing number of servers, driving infrastructure costs higher. Further, failure tolerance requires a large number of servers and physical equipment, also causing high costs.

Thus, there is a need for an improved system and method for deploying services in a scalable, lower cost manner.

Figure 1:
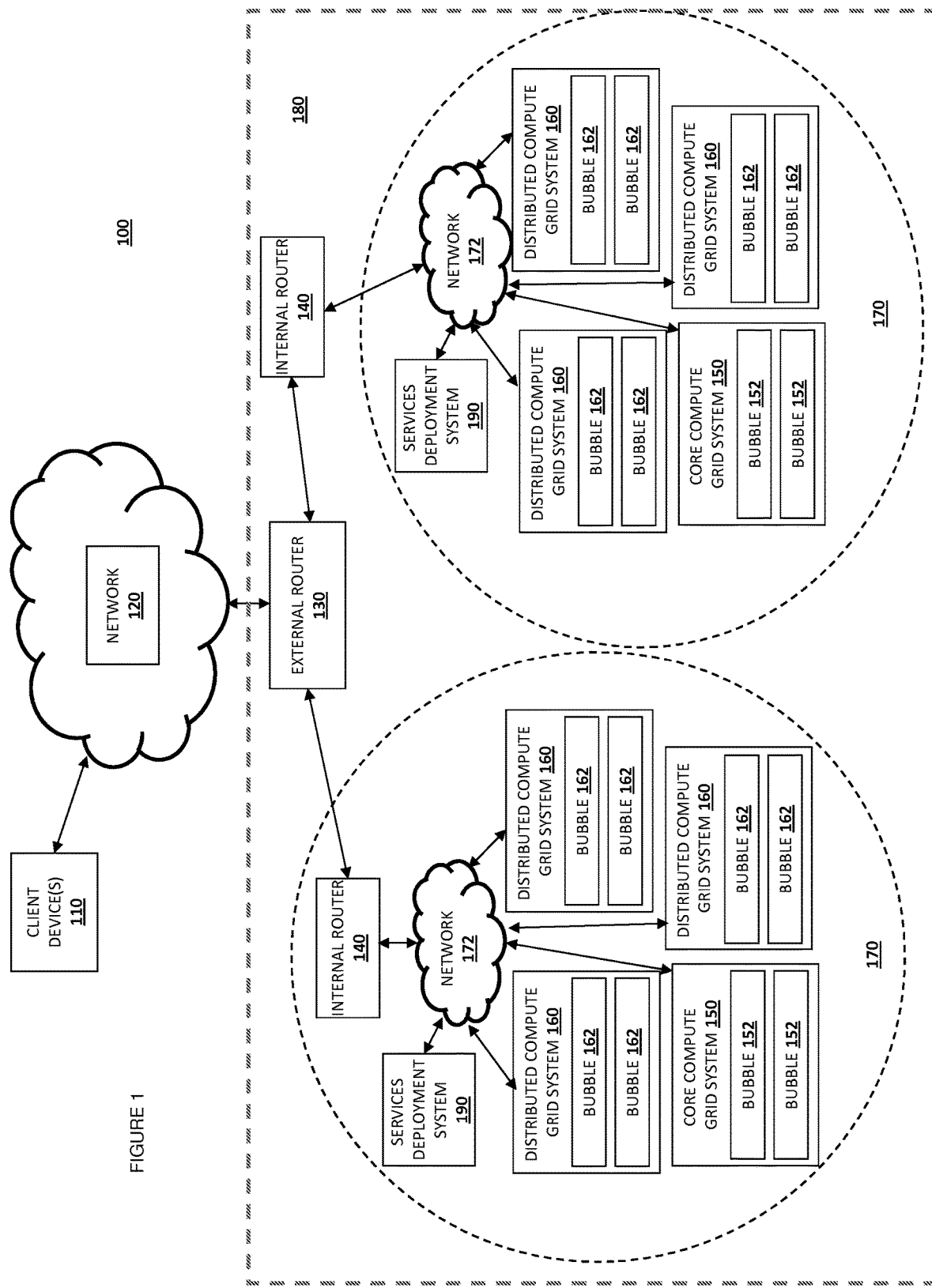
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for a mixed deployment architecture for distribution of services, where a given service may be distributed over multiple computing resources or limited to a single computing resource. As used herein, the term "computing resource" may refer to a single computing device, a virtual machine executing on a computer, a rack of computing devices, or any other combination or collection of computing devices. A data center system according to one embodiment comprises a core compute grid system. The core compute grid system provides one or more non-distributable service for a payment service provider. The core compute grid system also includes one or more isolated environment zones. The core compute grid system provides at least a database service for the payment service provider. The data center system further includes a plurality of distributed compute grid systems. Each distributed compute grid system provides one or more distributable services for the payment service provider, and each distributed compute grid system provides an identical set of distributable services. The data center system also includes a network coupling the core compute grid system and the plurality of distributed compute grid systems. The distributed compute grid systems transmit queued writes generated by the distributable services to the database service provided by the core compute grid system. The database service may provide a system of record for the payment service provider.

A practical reality of all businesses and other organizations that rely on computer systems for their operations is that computer systems fail. Whatever the reason a given computer system fails, ensuring that the organization can always operate requires some amount of backup planning, which may include one or more backup computer systems. One typical method of backup planning utilizes two computing systems with identical capabilities (methods of backup planning may also be referred to as capacity models). If a first computing system becomes unavailable for maintenance or other reasons, the second computing system can become available and no loss of operations is experienced.

Frequently, utilization of the two computing systems may be evenly divided, such that the first computing system is used for 50% of operations, while the second computing system is used for the other 50% of operations, and correspondingly, each computing system operates at 50% of its maximum capacity. If the first computing system is unavailable, the second computing system can be used for 100% of operations. Additionally, a third computing system having the same capacity may also be utilized for disaster recovery purposes. Often, the third computing system is not actively used for operations, in that operational traffic is not ordinarily directed to the third computing system, but can be if the need arises. The third computing system may be located in a different physical location than the first and second computing systems, such that a natural disaster affecting the first and second computing systems does not affect the third, and the third computing system can remain available. In the present disclosure, capacity may be referred to or measured in transactions per second, but should be understood to refer to other measures of capacity (throughput, operations per second, etc.).

While effective, the aforementioned method of backup planning is costly. In particular, if an organization desires a given level of maximum operational capacity (e.g., 500 transactions per second), effectively three times that level of computing equipment (1500 transactions per second) is needed to provide for failover and disaster recovery purposes. Thus, the first computing system, second computing system, and third computing system each must all be capable of performing 500 transactions per second. Even if the organization operates at 100% utilization (i.e., 500 transactions per second), the maximum utilization of all assets is 33% if failover and disaster recovery capabilities are maintained. This capacity model may be described as 3N: whatever N is defined as (e.g., in terms of maximum capacity), the organization requires three times N.

In accordance with one embodiment, various software components used by an organization, such as a payment service provider, may be distributed over multiple computing systems to provide the same failover, availability, and backup capabilities as the above example, but with a reduced need for computing systems. In the 3N model, for an organization to be capable of performing 500 transactions per second, two computing systems each being capable of performing 500 transactions per second are needed to satisfy the organization's need. In a distributed model, instead of using two identically-sized, relatively larger computing systems, multiple smaller computing systems are utilized which distribute the services and applications utilized by the organization. Thus, for example, three computing systems, each being capable of performing 250 transactions per second, may be utilized to provide the same level of 500 transactions per second. Here, each of the three computing systems may be used for 33% of operations. Even with an additional disaster recovery system having 100% of capacity, the total level of computing equipment required is equivalent to 1250 transactions per second of capacity. Thus, a data center system capable of providing distributable services on a distributed compute grid system provides for a lower total cost of computing equipment.

Referring now to FIG. 1, an embodiment of a networked system 100 is illustrated. The networked system 100 includes one or more client devices 110 that are coupled to a public network 120.

An external router 130 is coupled to the public network 120. The external router 130 may receive traffic from the public network 120 (e.g., from client devices 110), and direct that traffic to one or more internal routers 140. In one embodiment, the external router 130 directs traffic to internal routers 140 through an intermediary network (not shown). In one embodiment, the external router 130 may be part of a payment service provider system 180. Internal routers 140 may be part of a data center system 170, as shown in FIG. 1. In one embodiment, an internal router 140 may be separate from a data center system 170, as also shown in FIG. 1. Further, in one embodiment, internal router 140 may be connected to a data center network 172.

Each internal router 140 is coupled to one or more compute grid systems 150 and 160 through network 172. Core compute grid systems 150 may provide one or more non-distributable services or applications for a payment service provider. Distributed compute grid systems 160 may provide one or more distributable services or applications for a payment service provider. In one embodiment, core compute grid systems 150 and distributed compute grid systems 160 may host one or more virtual machines. Services or applications hosted by a core compute grid system 150 or distributed compute grid system 160 may operate within a virtual machine hosted on the system 150 or 160. In one embodiment, each data center system 170 may also include a services deployment system or module 190, which is further described below.

In greater detail, a core compute grid system 150 hosts or provides services or applications for a payment service provider that may not be split into a distributed fashion. In one embodiment, such services or applications are stateful (i.e., some maintenance of state information is required by the service or application). For example, a database service is a typical example of a stateful service, as the database service must maintain data that can be later retrieved, modified, deleted, or otherwise accessed. In one embodiment, two core compute grid systems may differ in type, capacity, processing power, storage space, or other characteristics. In one embodiment, services or applications hosted by a core compute grid system 150 may be hosted by multiple core compute grid systems 150. In one embodiment, communications between a core compute grid system 150 and another system, such as a distributed compute grid system 160, occur through a manageable routing abstraction layer. In one embodiment, a data center system 170 may include more than one core compute grid system 150, but because the services hosted by a core compute grid system 150 are not distributable, each individual core compute grid system 150 may host a different collection or set of services.

In one embodiment, non-distributable services or applications hosted by a core compute grid system 150 may include, for example, a client access license (CAL) server, a lightweight directory access protocol (LDAP) server, network accessible storage (NAS), a storage area network (SAN), a NoSQL server, or other stateful services and applications.

In one embodiment, a core compute grid system 150 may host one or more bubbles 152, in which applications may execute. Bubbles 152 may be used to provide, in one example, special isolated environments or zones. For example, a bubble 152 may be used for non-payment applications of a payment service provider which provide analytic services, because such non-payment applications must be isolated from payment applications hosted by the core compute grid system. Additionally, a core compute grid system 150 may host a development server or staging environment in which new services or applications are tested before being put into production.

In greater detail, distributed compute grid systems 160 host or provide services or applications that can be split into a distributed fashion. Thus, in contrast to core compute grid systems, such services or applications hosted by distributed compute grid systems 160 are generally stateless applications. A given service or application would be hosted on all distributed compute grid systems 160 within a particular data center. In one embodiment, distributed compute grid systems 160 may also host one or more bubbles 162, in which applications may execute. In one embodiment, distributed compute grid systems 160 of the same type are sized identically and have the same characteristics, such as processing power, storage space, and other characteristics.

In one embodiment, distributable services or applications hosted by distributed compute grid systems 160 may include, for example, a web server providing a payment service provider website. Other services or applications may include a domain name service (DNS) used by the payment service provider, a network time protocol (NTP) server used by the payment service provider, or a web server using hypertext transfer protocol (HTTP). Such services or applications are stateless, and thus can be provided by the distributed compute grid systems 160. Additionally, because services such as DNS do not require communication with other services, and do not require maintenance of state information, they can be hosted by multiple systems, and are particularly suitable for distribution and hosting by multiple distributed compute grid systems 160. In this way, scalability and increased capacity can be easily accomplished by adding another distributed compute grid system 160 hosting an identical set of services as the other distributed compute grid systems 160. Because each distributed compute grid system 160 hosts an identical set of services, requests for those services can be distributed among the various systems 160 to provide increased capacity and failure tolerance.

In one embodiment, a distributed compute grid system 160 or a core compute grid system 150 may be removable from active traffic routing configuration. In one embodiment, because distributed compute grid systems 160 host stateless services or applications, they may be removed from active traffic by updating a routing configuration, and removal has no effect on customers of the payment service provider, because other distributed compute grid systems 160 still provide the services or applications. In one embodiment, a removal of a core compute grid system 150 hosting a stateful application, such as a database application, may require a state transition to another core compute grid system 150, which may affect customers of the payment service provider.

In one embodiment, core compute grid systems 150 and distributed compute grid systems 160 are validated by monitoring the systems for failure with closed feedback loops for error detection and resolution purposes.

In the embodiments discussed below, each the core and distributed compute grid systems may be used by a payment service provider to provide one or more payment service provider applications, such as a checkout application, money sending application, and/or other payment service provider applications known in the art. As such, the external router 130, internal router 140, core compute grid systems 150, and distributed compute grid systems 160 may be part of a payment service provider system 180. Payment service provider system 180 may provide multiple applications to consumers and businesses that facilitate a wide variety of transactions. However, one of skill in the art in possession of the present disclosure will recognize that the systems and methods of the present disclosure will be beneficial to a wide variety of applications provided by a wide variety of different system providers. As such, while specific references are made to a payment service provider providing the systems and methods of the present disclosure, any system provider utilizing the teachings of the present disclosure to provide a distributed deployment architecture is envisioned as falling within the scope of the present disclosure.

The client devices, external router, internal router, core compute grid systems, and distributed compute grid systems may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 120.

The client devices 110 may be implemented using any appropriate combination of hardware and/or software configured for wired and/or wireless communication over network 120. For example, in one embodiment, the client devices 110 may be implemented as a personal computer of a user in communication with the Internet. In other embodiments, the client devices 110 may be a smart phone, laptop computer, wearable computing device, and/or other types of computing devices.

The client devices 110 may include one or more browser applications which may be used, for example, to provide a convenient interface to permit users to browse information available over the network 120. For example, in one embodiment, the browser application may be implemented as a web browser configured to view information available over the Internet.

The client devices 110 may also include one or more toolbar applications which may be used, for example, to provide user-side processing for performing desired tasks in response to operations selected by the user. In one embodiment, the toolbar application may display a user interface in connection with the browser application.

The client devices 110 may further include other applications as may be desired in particular embodiments to provide desired features to the client devices 110. In particular, the other applications may include a payment application for payments facilitated by a payment service provider through the payment service provider system 170. The other applications may also include security applications for implementing user-side security features, programmatic user applications for interfacing with appropriate application programming interfaces (APIs) over the network 120, or other types of applications. Email and/or text applications may also be included, which allow the user to send and receive emails and/or text messages through the network 120. The client device 110 include one or more user and/or device identifiers which may be implemented, for example, as operating system registry entries, cookies associated with the browser application, identifiers associated with hardware of the client device 110, or other appropriate identifiers, such as a phone number. In one embodiment, the user identifier may be used by the payment service provider system 180.

The network 120 may be implemented as a single network or a combination of multiple networks. For example, in various embodiments, the network 120 may include the Internet and/or one or more intranets, landline networks, local area networks, wide area networks, wireless networks, and/or other appropriate types of networks.

In one embodiment, core compute grid systems may host highly restricted zone services, as well as services connectable to a highly restricted zone. In one embodiment, core compute grid systems may provide services in a security zone using one or more virtual machines. In one embodiment, core compute grid systems support infrastructure-as-a-service (IaaS). IaaS systems may provide services to interact with raw computing resources, infrastructure resources, or virtual machine resources without observing any fixed deployment architecture patterns. In one embodiment, core compute grid systems do not support platform-as-a-service (PaaS). In one embodiment, applications or services hosted on a core compute grid system are active over more than one availability zone.

In one embodiment, core compute grid systems are used for services which require varying levels of availability, defined by service level agreement (SLA) requirements. These SLA levels may be based on the fact that a service interacts with customers synchronously. In one embodiment, core compute grid systems do not share core routing or primary power resources. The following paragraphs provide an example of hosting pattern types for core compute grid systems.

In one embodiment, core compute grid systems are used for services which use a shard database architecture, and which services are stateless, have a failover system, and are either active or passive services. Stateless failover may be referred to as such because no consistency gate exists to using the failover target. Thus, failover may be relatively fast and the service may provide continuous availability over a defined latency boundary. The sharded database may utilize a key based hashing algorithm which allows access to be spread evenly over core compute grid systems. The SLA requirement for a facility hosting a core compute grid system of this type may be 99.9%.

In one embodiment, core compute grid systems are used for services which use a shard database architecture, and which services require consistency, have a failover system, and are either active or passive services. One example of such a service is a Mongo database (MongoDB) service, which uses a shard key range/bucket algorithm to distribute writes and reads to multiple shards of a cluster. Each shard may be considered a replica set with its own unique master and replicas, in which the master can exist on only one of the potential core compute grid systems at one time. Masters may be distributed over multiple core compute grid systems, balancing load over all. Failover is stateful in such a service, requiring a new master to be elected in the set. Thus, such a system may take longer to fail over depending on a number of shards. Impact, however, may be limited to only the single shard where a new master needs to be elected. The SLA requirement for a facility hosting a core compute grid system of this type may be 99.99%.

In one embodiment, core compute grid systems are used for services which are stateless, have a failover system, and are active or passive. For example, these services may include implementations of continuous availability read services. Load may not be balanced between core compute grid systems, as only one system will be active at a time. Different database replicas may be placed over multiple core compute grid systems to balance load. Failover may not require a consistency gate, and thus continuous availability over a defined latency boundary may be provided. The SLA requirement for a facility hosting a core compute grid system of this type may be 99.9%.

In one embodiment, core compute grid systems are used for services which require consistency, have a failover system, and are active or passive. Examples of such systems may include strong consistency systems of record, such as database systems. Storage and networking may be shared resources for such systems, and failover between two core compute grid systems requires a consistency gate of multiple minutes, making the SLA for such a service relatively higher than for other services. The SLA requirement for a facility hosting a core compute grid system of this type may be 99.999%.

In one embodiment, core compute grid systems are used for services which are active and which do not have a failover system. This may be in rare cases, where a state machine will not exist in multiple core compute grid systems of a primary data center area. The SLA requirement for a facility hosting a core compute grid system of this type may be 99.999%.

In one embodiment, core compute grid systems are used for services which are stateless and which are active. These services may typically be provided by a distributed compute grid system, but other factors may prevent typical deployment. For example, secure physical machine requirements for cryptography services may require a core compute grid system to be used. The SLA requirement for a facility hosting a core compute grid system of this type may be 99.5%.

In one embodiment, distributed compute grid systems may be characterized as a repeatable building block providing various services for a payment service provider, such that multiple distributed compute grid systems can be deployed to scale the payment service provider. Thus, a distributed compute grid system may provide a manageable, available, and scalable architecture pattern.

In one embodiment, distributed compute grid systems may only provide highly restricted zone services. Such services may not accept or initiate sessions with third parties or services on public networks such as the Internet. In one embodiment, distributed compute grid systems may provide services in a security zone using one or more virtual machines. In one embodiment, distributed compute grid systems support infrastructure-as-a-service (IaaS). IaaS provide services to interact with raw compute resources, infrastructure resources, or virtual machine resources without observing any fixed deployment architecture patterns. In one embodiment, distributed compute grid systems support platform-as-a-service (PaaS). PaaS provide services to interact with application deployments packed in a distributed deployment architecture pattern through a service portal which hides complexity from an end user.

In one embodiment, a distributed compute grid system, and the services or applications which execute thereon, may not depend on synchronous interactions with other another distributed compute grid system or services or applications executing thereon. In one embodiment, distributed compute grid system dependencies outside of the distributed compute grid system may only communicate with other distributed compute grid systems through a manageable routing abstraction layer (MRAL). In one embodiment, distributed compute grid systems of the same type host identical services, and are sized identically. In one embodiment, the SLA of a single distributed compute grid system may be approximately 99%. Because services are distributed among multiple distributed compute grid systems, individual distributed compute grid systems can be taken down for maintenance, or removed from active traffic so that new services can be deployed or existing services can be upgraded. In one embodiment, facilities that make up a distributed compute grid system may not share uninterruptible power supply systems, routing and network facilities, cooling facilities, or primary power generation facilities.

In one embodiment, rules exist for the types of distributed state architectures which may be utilized in a service hosted on a distributed compute grid system. One such rule is that inclusion of a service hosted on a distributed compute grid system does not affect the ability to create additional distributed compute grid systems. This rule follows from the above requirement that a services and applications hosted on a distributed compute grid system do not depend on synchronous communications with other distributed compute grid systems. Additionally, however, distributed state which involves asynchronous replication must be carefully governed, such that increasing numbers of distributed compute grid systems has no effect on scalability of replication. Other such rules include a requirement that critical state is not stored in a distributed compute grid system, as SLA levels are lower, and a distributed compute grid system may be offline for portions of time. Alternatively, critical state may be replicated appropriately, or a disaster recovery strategy can allow for critical state to be stored by a distributed compute grid system.

In one embodiment, applications and services hosted on a distributed compute grid system write data to one or more queues in the distributed compute grid system. Queues may be implemented by, in one embodiment, a database service executing on the distributed compute grid system. In one embodiment, write operations queued by a distributed compute grid system are written to a system of record hosted on a core compute grid system, as explained above, which may be in part because the service providing system of record is not distributable.

In one embodiment, non-important state data generated by an application or service hosted on a distributed compute grid system writes data to a database service hosted on the distributed compute grid system. Because the state data is non-important, for example, transient session cache data, the data is not replicated.

Figure 2:
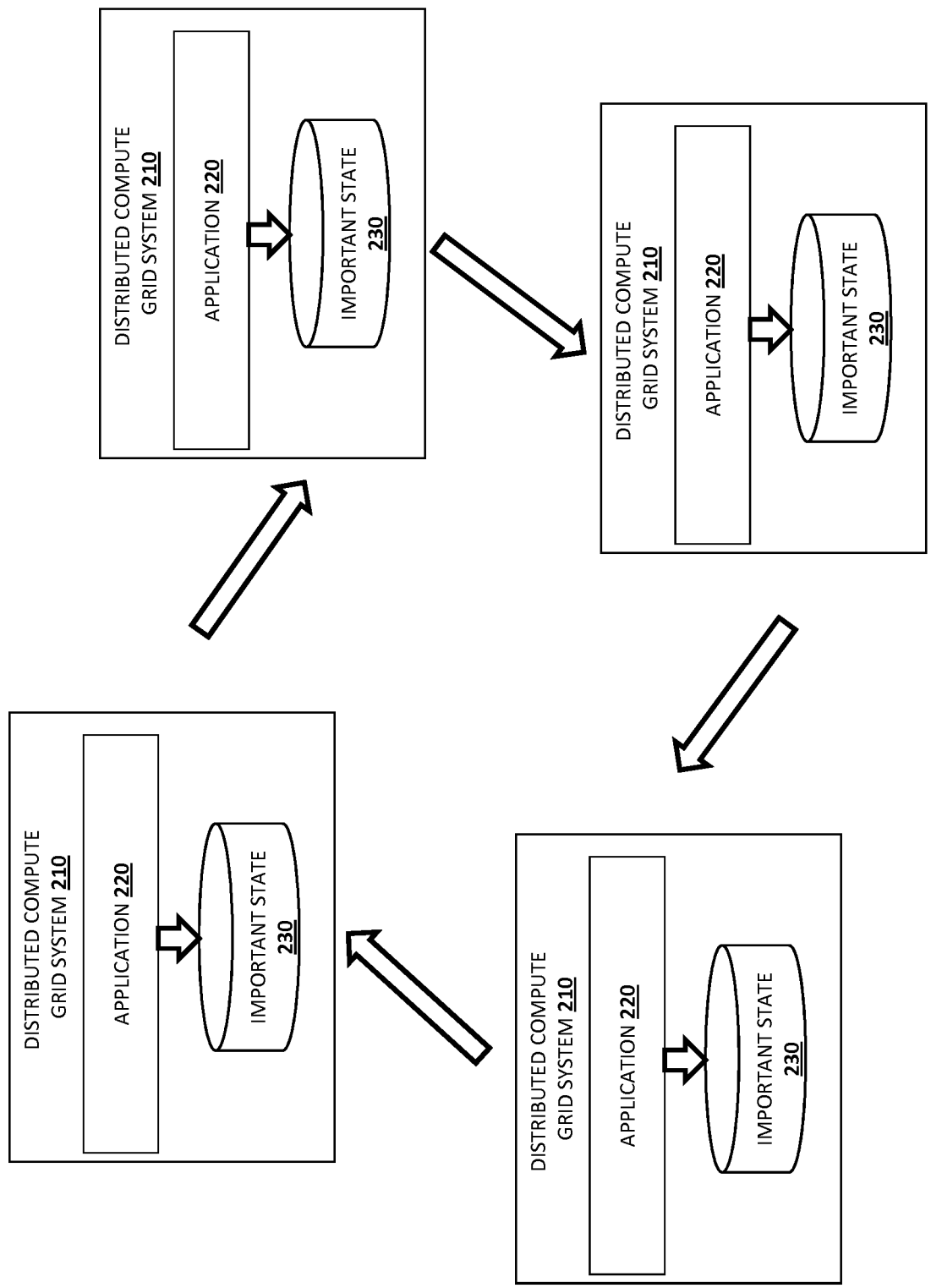
FIG. 2 is a diagram illustrating a ring replication strategy.

In one embodiment, a two-dimensional or three-dimensional ring replication strategy is employed. Ring replication is illustrated in FIG. 2. In the illustration of FIG. 2, important state generated by an application 220 hosted on, for example, distributed compute grid system 210 of FIG. 2 is replicated to other distributed compute grid systems 210 in the data center system. In one embodiment, the state data generated by application 220 is written to a cache or other data store 230. Thus, as shown in FIG. 2, the important state information from distributed compute grid system 210 of FIG. 2 is replicated to distributed compute grid system 220, to distributed compute grid system 230, and to distributed compute grid system 240. A ring replication strategy may guarantee a fixed number of replication channels independent of the number of distributed compute grid systems. In one embodiment, a ring replication strategy is only used for important state data, or state data that, in the event of a planned maintenance activity, needs to exist in whatever distributed compute grid system an active session is routed to. Whether a ring replication strategy is suitable may be based on the acceptability of end-user impact of important state data not existing.

In one embodiment, a deterministic message routing strategy is employed. In a deterministic message routing strategy, state data or queued writes stored by a database service executing on a distributed compute grid system is replicated to an assigned distributed compute grid system or a core compute grid system. In one embodiment, the core compute grid system may host a database service which serves as a system of record for the payment service provider. In one embodiment, data from the system of record is replicated to one or more distributed compute grid systems.

Figure 3:
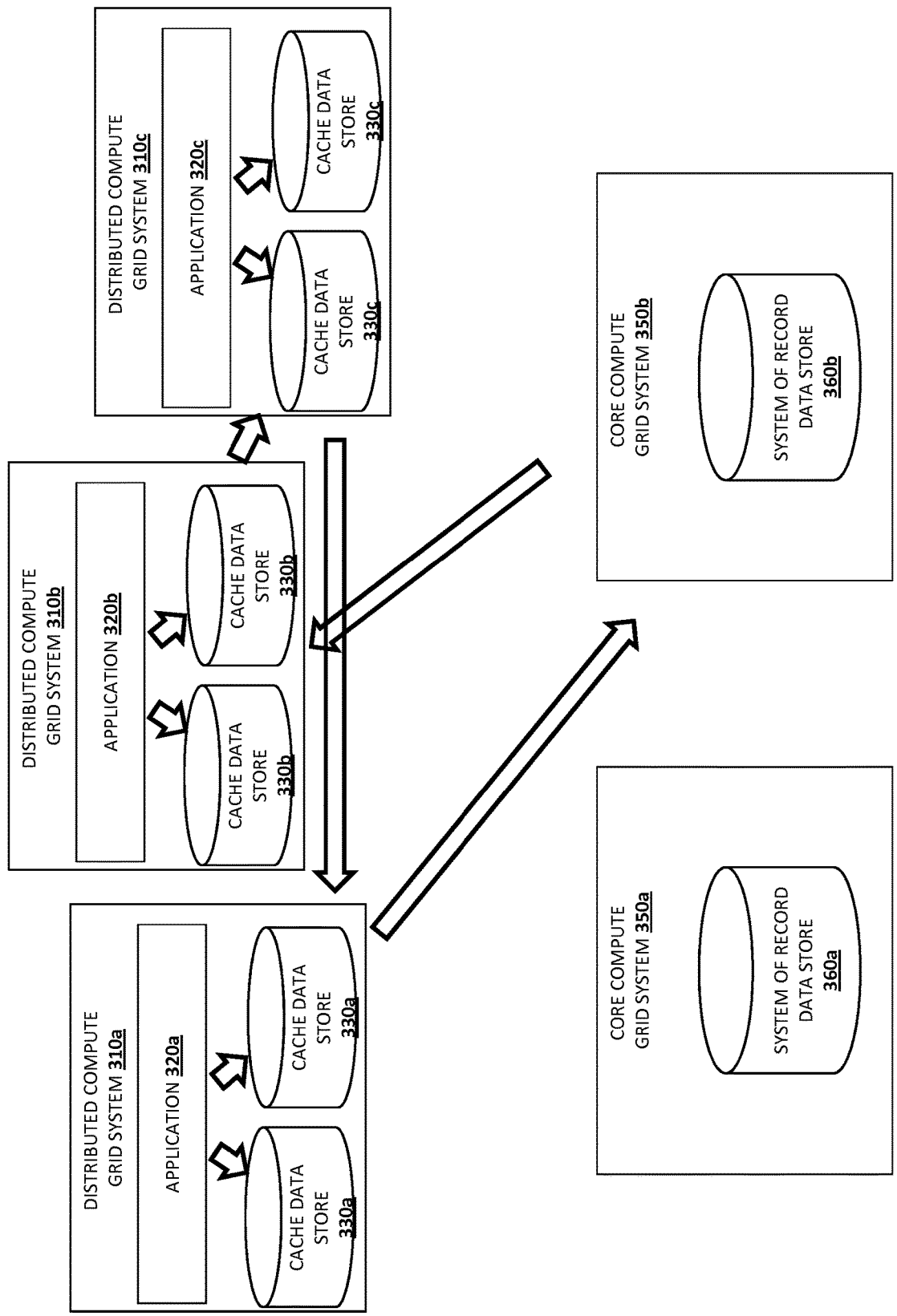
FIG. 3 is a diagram illustrating a deterministic message routing strategy.

An example of deterministic message routing can be seen in FIG. 3. In the example of FIG. 3, queued writes generated by an application 320a hosted by a distributed compute grid system 310a are initially written to one or more cache data stores 330a of the distributed compute grid system 310a. Queued writes from distributed compute grid system 310a are then written to a system of record data store 350b of core compute grid system 340b. In another example, queued writes from distributed compute grid system 310c are written to a cache data store 330a of the distributed compute grid system 310a, and similarly, queued writes from distributed compute grid system 310b are written to a cache data store 330c of the distributed compute grid system 310c. Further, system of record data store 350b of core compute grid system 340b may transmit information to distributed compute grid system 310b for usage by application 320b.

Figure 4:
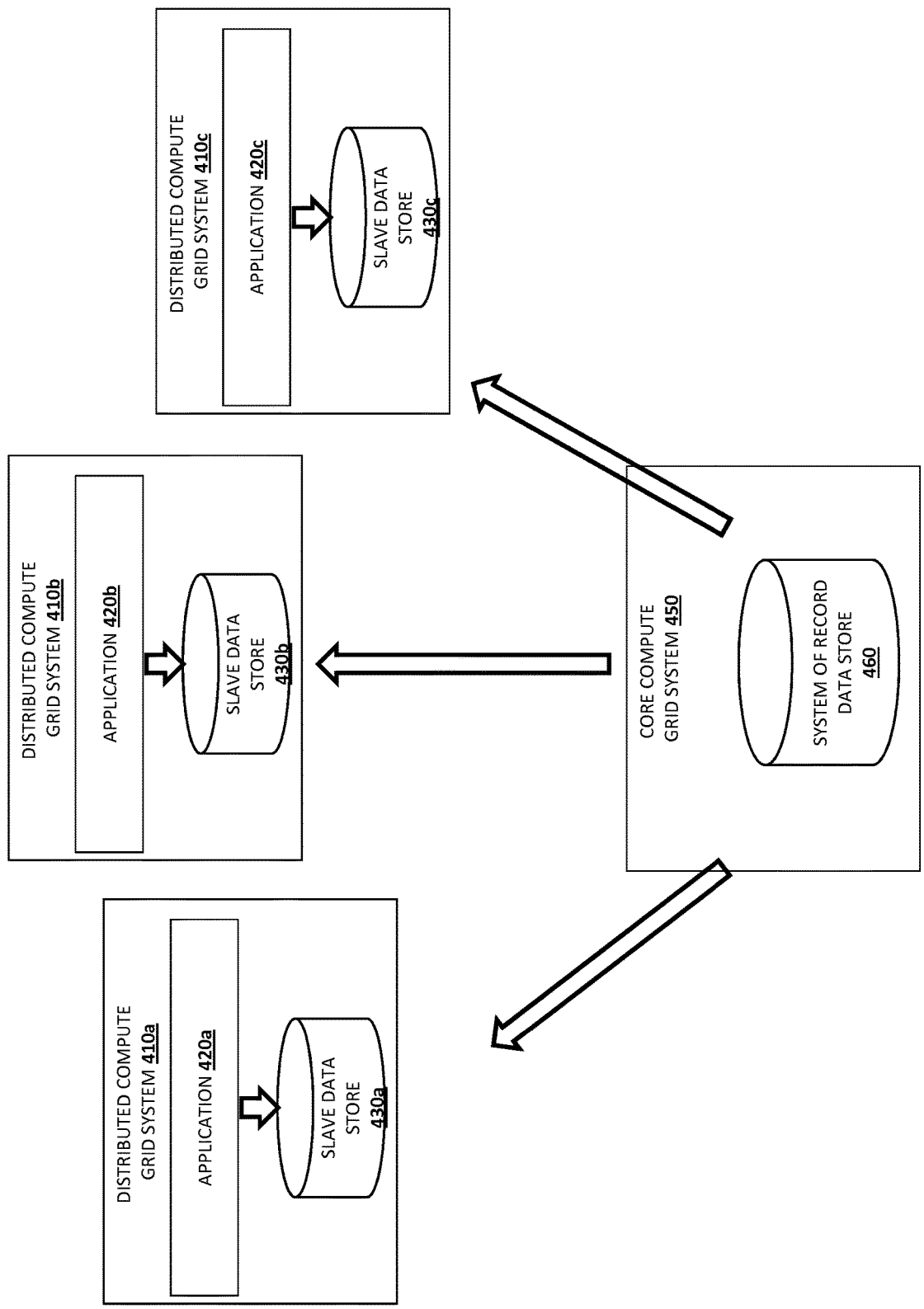
FIG. 4 is a diagram illustrating a master/slave message routing strategy.

In one embodiment, a master/slave message routing strategy is employed, in which the master device is a core compute grid system, and one or more distributed compute grid systems serve as the slave devices. Such a strategy may be appropriate to distribute small amounts of contents, or for simple caching, but cost must be considered before other uses are contemplated. An example of a master/slave message routing strategy may be seen in FIG. 4.

In one embodiment, each distributed core compute grid system includes a cache memory. In an embodiment, data written to the cache memory of the distributed core compute grid system is not replicated by default. However, an application or service developer can add a flag to an interface which writes data to cache, which may be referred to as a "critical state" flag. Data written to a cache which has the "critical state" flag may be replicated to other distributed compute grid systems. The replication may use, for example, the 2d or 3d ring replication strategy as described above.

In one embodiment, the minimum pool size, or minimum number of distributed compute grid systems in a data center, may be three. In one embodiment, as described above, communication to other distributed compute grid systems may only be asynchronous. Additionally, in one embodiment, communications between a core compute grid system and a distributed compute grid system pass through a manageable routing abstraction layer (MRAL).

Figure 5:
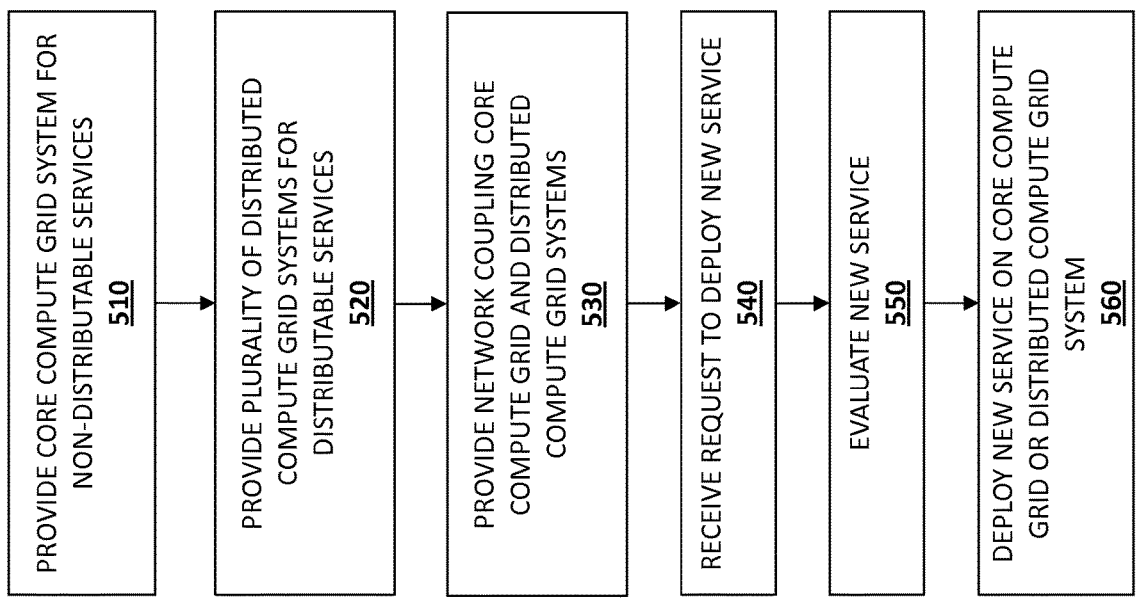
FIG. 5 is a flow chart illustrating an embodiment of a method for deploying a service for a payment service provider in a data center.

Referring now to FIG. 5, an embodiment of a method 500 for deploying a service for a payment service provider in a data center is described. The method 500 begins at block 510, where a core compute grid system is provided. As described above, the core compute grid system provides one or more non-distributable service for the payment service provider. The core compute grid system may also include one or more isolated environment zones and one or more bubbles in which services or applications may execute. Further, the core compute grid system may provide at least a database service for the payment service provider.

The method 500 then continues to block 520, where a plurality of distributed compute grid systems is provided. Each distributed compute grid system in the plurality provides one or more distributable services for the payment service provider. Further, each distributed compute grid system in the plurality provides an identical set of distributable services. For example, if a data center has three distributed compute grid systems, all three may provide DNS, HTTP, and NTP services.

The method 500 then continues to block 530, where a network coupling the core compute grid system and the plurality of distributed compute grid systems is provided. The network, in one embodiment, is a local area network or a wide area network, and may be provided by one or more routers, switches, or other networking hardware.

The method 500 then continues to block 540, where a request to deploy a new service for the payment service provider is received. In one embodiment, the request is received by a services deployment module. The services deployment module may coordinate and be responsible for the deployment of new services developed by employees of the payment service provider or third parties. For example, an employee of the payment service provider may modify code of a web server used by the payment service provider, and may wish to deploy the new code into a production environment. Thus, the employee may submit the code to a services deployment module so that the new code can be utilized by the payment services provider. In another example, the payment service provider may wish to utilize a cryptography service purchased from a third party, and may wish to deploy such a service in its data centers.

The method 500 then continues to block 550, where the services deployment module evaluates the new service to determine a target system on which to host the new service. In one embodiment, the evaluation may include determining that the new service requires maintenance of state information (i.e., is a stateful service), and thus must be deployed on a core compute grid system. In one embodiment, the evaluation may include determining a service level agreement metric for the new service, and thus the service must be deployed on a core compute grid system having a high SLA. In one embodiment, the evaluation may include determining whether the new service provides a system of record, and thus must be deployed on a core compute grid system. In one embodiment, the evaluation may include determining communication requirements of the new service. For example, if the new service does not need to synchronously communicate with other services, it can be deployed on a distributed compute grid system.

The method 500 then continues to block 560, where, in response to the evaluation at block 550, the service is deployed on the core compute grid system or the plurality of distributed compute grid systems. In one embodiment, if the service is to be deployed on the distributed compute grid systems, it is deployed on all distributed compute grid systems, such that the plurality of distributed compute grid systems hosts an identical set of services. In one embodiment, if the service is to be deployed on a core compute grid system, it may be deployed on multiple core compute grid systems.

Figure 6:
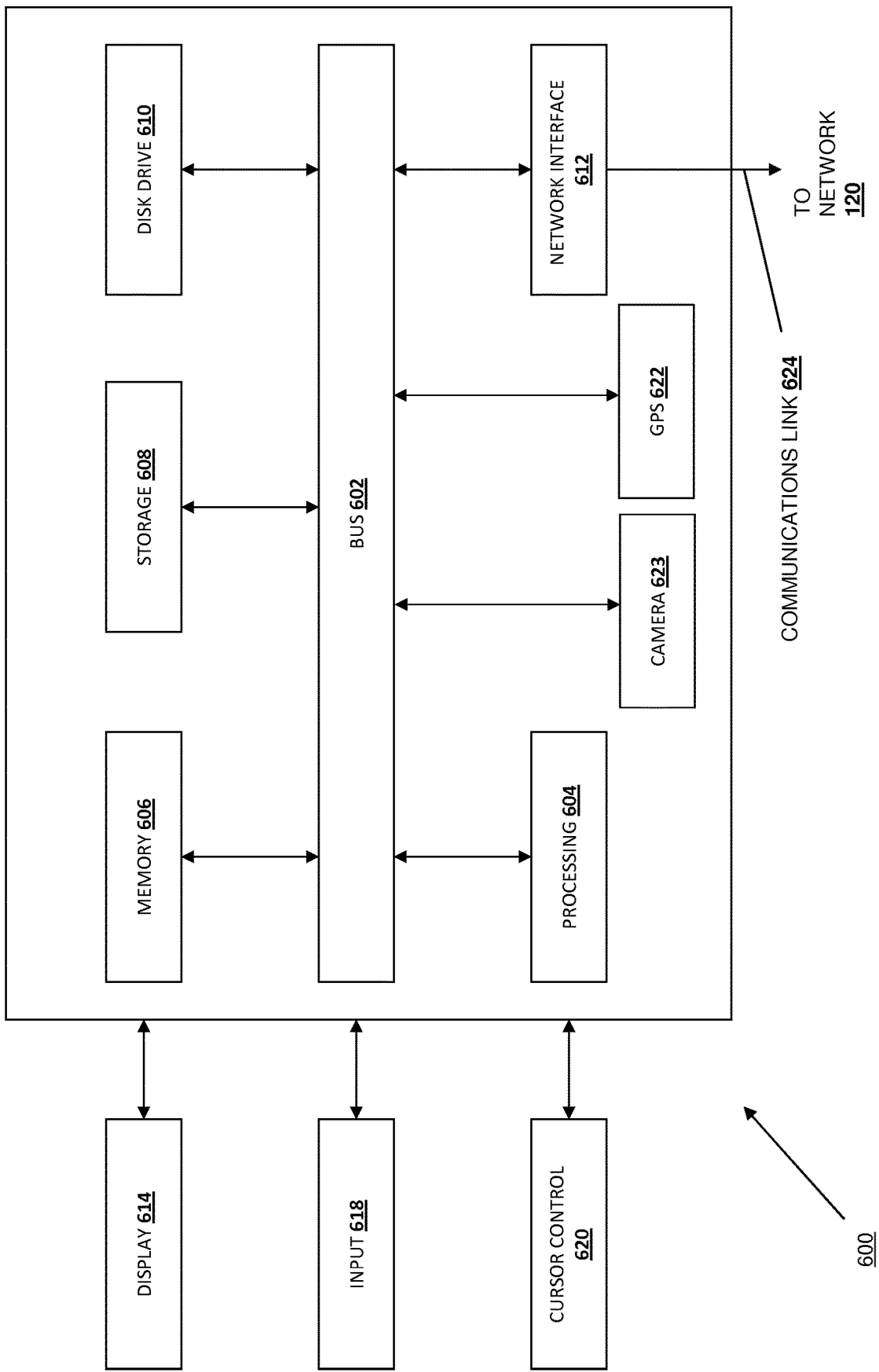
FIG. 6 is a schematic view illustrating an embodiment of a system provider device.

Referring now to FIG. 6, an embodiment of a computer system 600 suitable for implementing, for example, the client device 110, external router 130, internal router 140, core compute grid system 150, distributed compute grid system 160, and/or services deployment system 190, is illustrated. It should be appreciated that other devices utilized by customers, merchants, payment service providers, and/or system providers in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera component 623. In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the client devices 110, external router 130, internal router 140, core compute grid system 150, distributed compute grid system 160, and/or services deployment system 190. Such instructions may be read into the system memory component 406 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 120 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of deploying a service for a service provider in a data center, the method comprising:
   receiving, by one or more hardware processors, a request to deploy a computer application corresponding to the service for the service provider in the data center, wherein the data center comprises a core compute grid system and a plurality of distributed compute grid systems coupled together via an internal network of the data center, wherein the plurality of distributed compute grid systems communicate with each other asynchronously via the internal network, and wherein a database application for providing a database service for the service provider is implemented within the core compute grid system;
   analyzing, by the one or more hardware processors, computer code of the computer application;
   determining, by the one or more hardware processors, whether the computer application corresponds to a stateful service based on the analyzing;
   in response to determining that the computer application does not correspond to a stateful service, deploying, by the one or more hardware processors, the computer application on each of the plurality of distributed compute grid systems, wherein the plurality of distributed compute grid systems is configured to simultaneously provide the service for the service provider based on communication with the core compute grid system for accessing the database application;
   allocating a portion of processing capacity of each of the plurality of distributed compute grid systems to the computer application based on a service level agreement metric associated with the service;
   receiving an indication that first stateful data associated with the computer application is generated by a first distributed compute grid system of the plurality of distributed compute grid systems in response to processing a transaction for a user;
   determining a data replication route through the plurality of distributed compute grid systems;
   replicating the first stateful data to other distributed computer grid systems in the plurality of distributed compute grid systems according to the data replication route; and
   transmitting the first stateful data to the database application of the core compute grid system through a routing abstraction layer.

2. The method of claim 1, further comprising determining the service level agreement metric associated with the service, wherein the computer application is deployed on each of the plurality of distributed compute grid systems further based on the service level agreement metric.

3. The method of claim 1, further comprising determining a communication requirement of the service, wherein the computer application is deployed on each of the plurality of distributed compute grid systems further based on the communication requirement.

4. The method of claim 1 further comprising:
   detecting that a first one of the plurality of distributed compute grid systems is unavailable; and
   in response to the detecting, modifying the portion of processing capacity of a second one of the plurality distributed compute grid systems allocated to the computer application.

5. The method of claim 4, further comprising:
   causing the second one of the plurality distributed compute grid systems to use the modified portion of processing capacity to perform the service for the data center.

6. The method of claim 1, wherein each of the plurality of distributed compute grid systems includes a cache memory for storing data associated with the computer application deployed on the corresponding distributed compute grid system, and wherein stateless data associated with the computer application written to a first cache memory of the first distributed compute grid system is not replicated to other distributed compute grid systems in the plurality of distributed compute grid systems.

7. The method of claim 1, wherein each of the plurality of distributed compute grid systems includes a cache memory for storing data associated with the computer application deployed on the corresponding distributed compute grid system, wherein the first stateful data is written to a first cache memory of the first distributed compute grid system, and wherein the first stateful data is replicated to the other distributed compute grid systems in the plurality of distributed compute grid systems based on a critical state flag associated with the data.

8. A system comprising:
   a non-transitory memory; and
   one or more hardware processors coupled to the non-transitory memory and configured to read instructions from the non-transitory memory to cause the system to perform operations comprising:
      receiving a request to deploy a computer application corresponding to a service in a data center system, wherein the data center comprises a core compute grid system and a plurality of distributed compute grid systems coupled together via an internal network of the data center, wherein the plurality of distributed compute grid systems communicate with each other asynchronously via the internal network, and wherein a database application for providing a database service for the data center is implemented within the core compute grid system;
      analyzing computer code associated with the computer application;
      determining whether the computer application is a stateful application based on the analyzing;
      determining to deploy the computer application on each of the plurality of distributed compute grid systems and not on the core compute grid system based on determining that the computer application is not a stateful application;

deploying the computer application on each of the plurality of distributed compute grid systems, wherein the plurality of distributed compute grid system is configured to simultaneously provide the service corresponding to the computer application based on communication with the core compute grid system for accessing the database application;

allocating a portion of processing capacity of each of the plurality of distributed compute grid systems to the computer application based on a service level agreement metric associated with the service;

receiving an indication that first stateful data associated with the computer application is generated by a first distributed compute grid system of the plurality of distributed compute grid systems in response to processing a payment transaction for a user;

determining a data replication route through the plurality of distributed compute grid systems;

replicating the first stateful data to other distributed compute grid systems in the plurality of distributed compute grid systems according to the data replication route; and transmitting the first stateful data to the database application of the core compute grid system through a routing abstraction layer.

9. The system of claim 8, wherein each of the plurality of distributed compute grid systems includes a cache memory for storing data associated with the computer application deployed on the corresponding distributed compute grid system, and wherein stateless data associated with the computer application written to a first cache memory of the first distributed compute grid system is not replicated to other distributed compute grid systems in the plurality of distributed compute grid systems.

10. The system of claim 8, wherein each of the plurality of distributed compute grid systems includes a cache memory for storing data associated with the computer application deployed on the corresponding distributed compute grid system, wherein the first stateful data is written to a first cache memory of the first distributed compute grid system, and wherein the first stateful data is replicated to the other distributed compute grid systems in the plurality of distributed compute grid systems based on a critical state flag associated with the data.

11. The system of claim 8, wherein the operations further comprise:
    detecting that a first one of the plurality of distributed compute grid systems is unavailable; and
    in response to the detecting, modifying the portion of processing capacity of a second one of the plurality distributed compute grid systems allocated to the computer application.

12. The system of claim 8, wherein the service comprises at least one of a web service, a cryptography service, or an analytics service.

13. The system of claim 8, wherein the operations further comprise determining the service level agreement metric associated with the service, wherein the computer application is determined to deploy on each of the plurality of distributed compute grid systems and not on the core compute grid system further based on the service level agreement metric.

14. A non-transitory machine-readable medium having stored thereon machine-readable instructions executable to cause a machine to perform operations comprising:
    receiving a request to deploy a service in a data center, wherein the data center comprises a core compute grid system and a plurality of distributed compute grid systems coupled together via an internal network of the data center, wherein the plurality of distributed compute grid systems communicate with each other asynchronously via the internal network, and wherein a database application for providing a database service for the data center is implemented within the core compute grid system;
    determining that the service corresponds to a stateless service based on analyzing the service;
    determining to deploy a computer application corresponding to the service on each of the plurality of distributed compute grid systems and not on the core compute grid system based on the determining that the service corresponds to a stateless service;
    deploying the computer application on each of the plurality of distributed compute grid systems, wherein the plurality of distributed compute grid system is configured to simultaneously provide the service based on communication with the core compute grid system for accessing the database application;
    allocating a portion of processing capacity of each of the plurality of distributed compute grid systems to the computer application based on a service level agreement metric associated with the service;
    receiving an indication that first stateful data associated with the computer application is generated by a first distributed compute grid system of the plurality of distributed compute grid systems in response to processing a payment transaction for a user;
    determining a data replication route through the plurality of distributed compute grid systems;
    replicating the first stateful data to other distributed compute grid systems in the plurality of distributed compute grid systems according to the data replication route; and
    transmitting the first stateful data to the database application of the core compute grid system through a routing abstraction layer.

15. The non-transitory machine-readable medium of claim 14, wherein the operations further comprise:
    detecting that a first one of the plurality of distributed compute grid systems is unavailable; and
    in response to the detecting, modifying the portion of processing capacity of a second one of the plurality distributed compute grid systems allocated to the computer application.

16. The non-transitory machine-readable medium of claim 15, wherein the operations further comprise:
    causing the second one of the plurality distributed compute grid systems to use the modified portion of processing capacity to perform the service for the data center.

17. The non-transitory machine-readable medium of claim 14, wherein the operations further comprise determining the service level agreement metric associated with the service, wherein the computer application is determined to deploy on each of the plurality of distributed compute grid systems and not on the core compute grid system further based on the service level agreement metric.

18. The non-transitory machine-readable medium of claim 14, wherein each of the plurality of distributed compute grid systems includes a cache memory for storing data associated with the computer application deployed on the corresponding distributed compute grid system, and wherein stateless data associated with the computer application written to a first cache memory of the first distributed compute grid system is not replicated to other distributed compute grid systems in the plurality of distributed compute grid systems.

19. The non-transitory machine-readable medium of claim 14, wherein each of the plurality of distributed compute grid systems includes a cache memory for storing data associated with the computer application deployed on the corresponding distributed compute grid system, wherein the first stateful data is written to a first cache memory of the first distributed compute grid system, and wherein the first stateful data is replicated to the other distributed compute grid systems in the plurality of distributed compute grid systems based on a critical state flag associated with the data.

20. The non-transitory machine-readable medium of claim 14, wherein the service comprises at least one of a web service, a cryptography service, or an analytics service.

* * * * *